United States Patent
Ishii et al.

(10) Patent No.: US 10,535,867 B2
(45) Date of Patent: Jan. 14, 2020

(54) NON-AQUEOUS ELECTROLYTE SECONDARY BATTERY

(71) Applicant: Toyota Jidosha Kabushiki Kaisha, Toyota-shi, Aichi-ken (JP)

(72) Inventors: Kenta Ishii, Seto (JP); Ryosuke Ohsawa, Okazaki (JP); Koji Abe, Tokyo-to (JP); Kei Shimamoto, Sakai (JP); Makoto Babazono, Ube (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 139 days.

(21) Appl. No.: 15/870,457

(22) Filed: Jan. 12, 2018

(65) Prior Publication Data

US 2018/0205071 A1    Jul. 19, 2018

(30) Foreign Application Priority Data

Jan. 13, 2017 (JP) ................. 2017-004558
Dec. 7, 2017 (JP) ................. 2017-234987

(51) Int. Cl.

| | |
|---|---|
| *H01M 4/133* | (2010.01) |
| *H01M 10/36* | (2010.01) |
| *H01M 10/0564* | (2010.01) |
| *H01M 10/0569* | (2010.01) |
| *H01M 10/0525* | (2010.01) |
| *H01M 4/36* | (2006.01) |

(52) U.S. Cl.
CPC ........... *H01M 4/133* (2013.01); *H01M 4/366* (2013.01); *H01M 10/0525* (2013.01); *H01M 10/0564* (2013.01); *H01M 10/0569* (2013.01); *H01M 10/36* (2013.01); *H01M 2300/0042* (2013.01); *H01M 2300/0065* (2013.01); *Y02T 10/7011* (2013.01)

(58) Field of Classification Search
CPC ......... H01M 10/0569; H01M 10/0564; H01M 10/0525; H01M 10/36; H01M 4/133; H01M 2300/0065; H01M 2300/0042; H01M 4/366; Y02T 10/7011
See application file for complete search history.

(56) References Cited

U.S. PATENT DOCUMENTS

| | | | |
|---|---|---|---|
| 2015/0249271 A1 | 9/2015 | Choi et al. | |
| 2016/0028115 A1 | 1/2016 | Kim et al. | |
| 2016/0149263 A1* | 5/2016 | Hallac | H01M 10/0569 429/163 |
| 2018/0277900 A1* | 9/2018 | Abe | H01M 10/0569 |

FOREIGN PATENT DOCUMENTS

| | | |
|---|---|---|
| JP | 2015528640 A | 9/2015 |
| JP | 2017069132 A | 4/2017 |
| KR | 1020150050493 A | 5/2015 |
| WO | 2017057588 A1 | 4/2017 |

* cited by examiner

*Primary Examiner* — Laura Weiner
(74) *Attorney, Agent, or Firm* — Dinsmore & Shohl LLP (57) ABSTRACT

The present teaching provides a non-aqueous electrolyte secondary battery provided with a non-aqueous electrolyte solution having a composition able to achieve high battery performance even in an extremely low temperature region (for example, −30° C. or lower). The non-aqueous electrolyte solution disclosed herein contains, as non-aqueous solvents, ethylene carbonate (EC), propylene carbonate (PC), dimethyl carbonate (DMC), ethyl methyl carbonate (EMC) and ethyl propionate (EP), and when the total volume of the non-aqueous solvents is 100 vol. %, the content of EC is 20 to 30 vol. %, the content of PC is 5 to 10 vol. %, the content of EP is 5 to 10 vol. %, and the content of DMC+EMC is 50 to 70 vol. %.

16 Claims, 2 Drawing Sheets

NON-AQUEOUS ELECTROLYTE SECONDARY BATTERY

CROSS-REFERENCE TO RELATED APPLICATIONS

The present application claims priority to Japanese Patent Application No. 2017-004558 filed on Jan. 13, 2017 and to Japanese Patent Application No. 2017-234987 filed on Dec. 7, 2017, the entire contents of which are hereby incorporated by reference.

TECHNICAL FIELD

The present teaching relates to a non-aqueous electrolyte secondary battery such as a lithium ion secondary battery. More specifically, the present teaching relates to the composition of an electrolyte solution of a non-aqueous electrolyte secondary battery.

BACKGROUND

Demand has increased in recent years for non-aqueous electrolyte secondary batteries as so-called portable power sources for personal computers, hand-held devices, and the like, or as power sources for driving vehicles. In particular, lightweight lithium ion secondary batteries able to achieve high energy densities can be used as high output power sources for driving vehicles such as electric vehicles and hybrid vehicles.

In non-aqueous electrolyte solutions used in such secondary batteries, the types of solvent and supporting salt (electrolyte) are selected and used from perspectives such as improving the performance and durability of a battery. For example, Japanese Translation of PCT Application No. 2015-528640 (WO2014/081254) discloses a non-aqueous electrolyte solution for a lithium ion secondary battery, which is provided in order to improve the ionic conductivity of a non-aqueous electrolyte solution in low temperature regions by suppressing an increase in viscosity of the electrolyte solution, and which is characterized in that 10 to 90 wt. % of the overall solvent is an ester-based solvent and 10 to 90 wt. % of the overall solvent is a carbonate-based solvent.

SUMMARY

However, the technique disclosed in this publication (WO2014/081254) does not take into account a case in which a battery is used in an extremely low temperature region such as −30° C. or lower (for example, −40° C. to −30° C.), and there is no data relating to the behavior of non-aqueous electrolyte solutions in the extremely low temperature region. Therefore, in a concept whereby an ester-based solvent and a carbonate-based solvent are simply mixed, such as that disclosed in this publication (WO2014/081254), it is difficult to provide a non-aqueous electrolyte solution for stably achieving good battery performance even in the extremely low temperature region. As a result, the present teaching was developed with these circumstances in mind, and has an object of providing a non-aqueous electrolyte solution for a secondary battery, having a composition able to stably achieve good battery performance even in an extremely low temperature region, such as −30° C. or lower (for example, −40° C. to −30° C.). Another object of the present teaching is to provide a non-aqueous electrolyte secondary battery which is provided with the non-aqueous electrolyte solution and which exhibits excellent low temperature characteristics.

The inventors of the present teaching have investigated a variety of carbonate-based solvents and ester-based solvents able to be used as non-aqueous solvents in non-aqueous electrolyte secondary batteries such as lithium ion secondary batteries. In addition, the inventors of the present teaching have created non-aqueous electrolyte solutions having compositions able to achieve high battery performance even in an extremely low temperature region (for example, −30° C. or lower), and thereby completed the present teaching. That is, the teaching disclosed herein relates to a non-aqueous electrolyte secondary battery containing a non-aqueous electrolyte solution that contains a non-aqueous solvent and an electrolyte, and is characterized in that the non-aqueous solvent is prepared using a cyclic carbonate-based solvent, a linear carbonate-based solvent, and an ester-based solvent as primary components.

In some aspects of the non-aqueous electrolyte secondary battery disclosed herein, the non-aqueous solvent contains at least ethylene carbonate (EC) and propylene carbonate (PC) as cyclic carbonate-based solvents, contains at least dimethyl carbonate (DMC) and ethyl methyl carbonate (EMC) as linear carbonate-based solvents, and contains at least ethyl propionate (EP) as an ester-based solvent. By using a non-aqueous electrolyte secondary battery obtained by blending these five solvents, it is possible to improve battery performance in the extremely low temperature region.

In other aspects of the non-aqueous electrolyte secondary battery disclosed herein, when the total volume of the non-aqueous solvents is 100 vol. %, the content of ethylene carbonate (EC) is 20 to 30 vol. %; the content of propylene carbonate (PC) is 5 to 10 vol. %; the content of ethyl propionate (EP) is 5 to 10 vol. %; and the total content of dimethyl carbonate (DMC) and ethyl methyl carbonate (EMC), that is, DMC+EMC is 50 to 70 vol. %. By using a non-aqueous electrolyte solution formed by blending the solvents mentioned above at these blending proportions, it is possible to provide a non-aqueous electrolyte secondary battery which exhibits good battery performance in the extremely low temperature region while maintaining the flash point of the electrolyte solution at a temperature of 21° C. or higher.

In still other aspects of the non-aqueous electrolyte secondary battery disclosed herein, the content of the dimethyl carbonate (DMC) and the content of the ethyl methyl carbonate (EMC) are both 25 to 35 vol. %. By blending DMC and EMC at such quantities (and in some embodiments, almost equal quantities), stable battery performance (for example, stable high rate charging and discharging) is achieved.

In other aspects of the non-aqueous electrolyte secondary battery disclosed herein, the non-aqueous electrolyte solution has a freezing point of lower than −40° C. By preparing a non-aqueous electrolyte solution in such a way that the freezing point at atmospheric pressure is lower than −40° C. (and in some embodiments, lower than −45° C., for example not lower than −60° C. and lower than −45° C.), it is possible to further improve battery characteristics in an extremely low temperature region such as −30° C. or lower (for example, −30° C. to −40° C.).

In another aspect of the non-aqueous electrolyte secondary battery disclosed herein, the non-aqueous electrolyte solution has an ionic conductivity (mS/cm) of 1.0 or more at −40° C. Here, ionic conductivity measurements are based on an AC impedance method. By maintaining high ionic conductivity in the extremely low temperature region, it is possible to maintain good output characteristics in the extremely low temperature region.

A non-aqueous electrolyte secondary battery disclosed herein (for example, a lithium ion secondary battery) can exhibit good battery performance in an extremely low temperature region (for example, −40° C. to −30° C.). Therefore, this non-aqueous electrolyte secondary battery can supply electrical power for driving a motor in an extremely low temperature region, for example, and can be used as a power source for driving a vehicle in cold weather regions, where high performance is required.

DETAILED DESCRIPTION

With reference to the drawings, a detailed explanation will now be given of the constitution of a prismatic lithium ion secondary battery having a sealed structure as an embodiment of the non-aqueous electrolyte secondary battery disclosed herein. Matters other than those explicitly mentioned in the present specification but which are useful for carrying out the teaching are matters that a person skilled in the art could understand to be matters of design on the basis of the prior art in this technical field. The present teaching can be carried out on the basis of the matters disclosed in the present specification and common general technical knowledge in this technical field. Moreover, cases where numerical ranges in the present specification and the claims are written as A-B (here, A and B are arbitrary numbers) mean the same as in ordinary interpretations and mean not less than A and not more than B.

In the present specification, "non-aqueous electrolyte secondary battery" means a secondary battery in which solvents that constitute an electrolyte solution are constituted mainly from non-aqueous solvents (that is, organic solvents). Here, "secondary battery" means a power storage device which can be charged and discharged and which can repeatedly produce prescribed electrical energy. For example, lithium ion secondary batteries, sodium ion secondary batteries, and the like, in which movement of charge is borne by alkali metal ions in a non-aqueous electrolyte solution, are typical examples encompassed by the non-aqueous electrolyte secondary battery mentioned here. "Electrode body" means a structure which forms the main component of a battery and which includes a positive electrode, negative electrode and, between the positive and negative electrodes, a porous insulating layer able to function as a separator. "Positive electrode active material" or "negative electrode active material" (these are, in some cases, referred to in generic terms as "electrode active material") means a compound able to reversibly store and release chemical species that serve as charge carriers (for example, lithium ions in a lithium ion secondary battery, or sodium ions in a sodium ion secondary battery) (positive electrode active material or negative electrode active material).

Embodiments of the present teaching will now be explained in detail using mainly cases in which the present teaching is applied to a lithium ion secondary battery having a constitution whereby a wound electrode body and a non-aqueous electrolyte solution are housed in a square battery case as typical examples of non-aqueous electrolyte secondary batteries, but the present teaching is in no way limited to these embodiments. For example, a wound electrode body is merely an example, and the technical concept of the present teaching can also be applied to other shapes (for example, layered electrode bodies). In addition, the shape (external shape and size) of the non-aqueous electrolyte secondary battery is not particularly limited.

Figure 1:
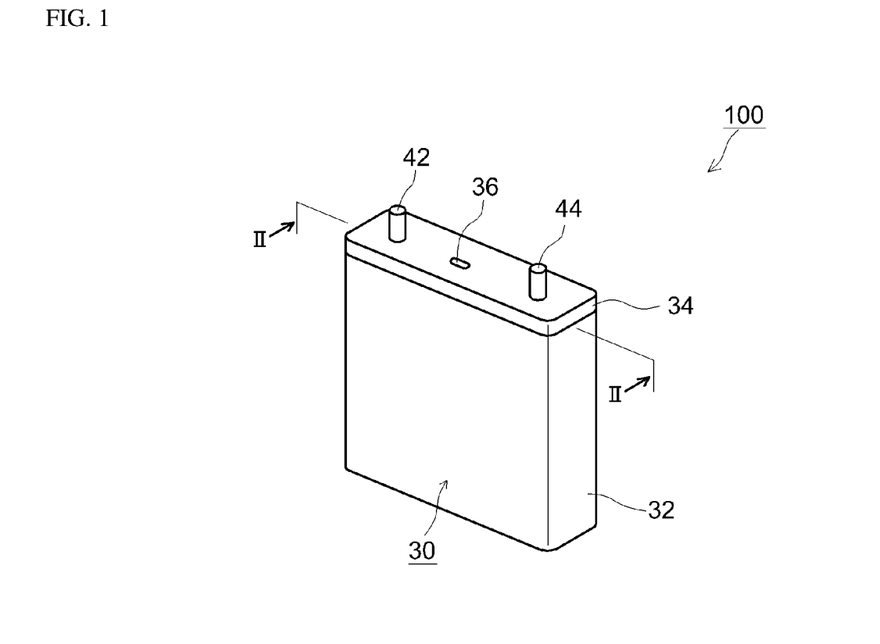
FIG. 1 is a perspective view that schematically illustrates the external shape of a battery in one embodiment of the non-aqueous electrolyte secondary battery disclosed herein (a lithium ion secondary battery)
Figure 2:
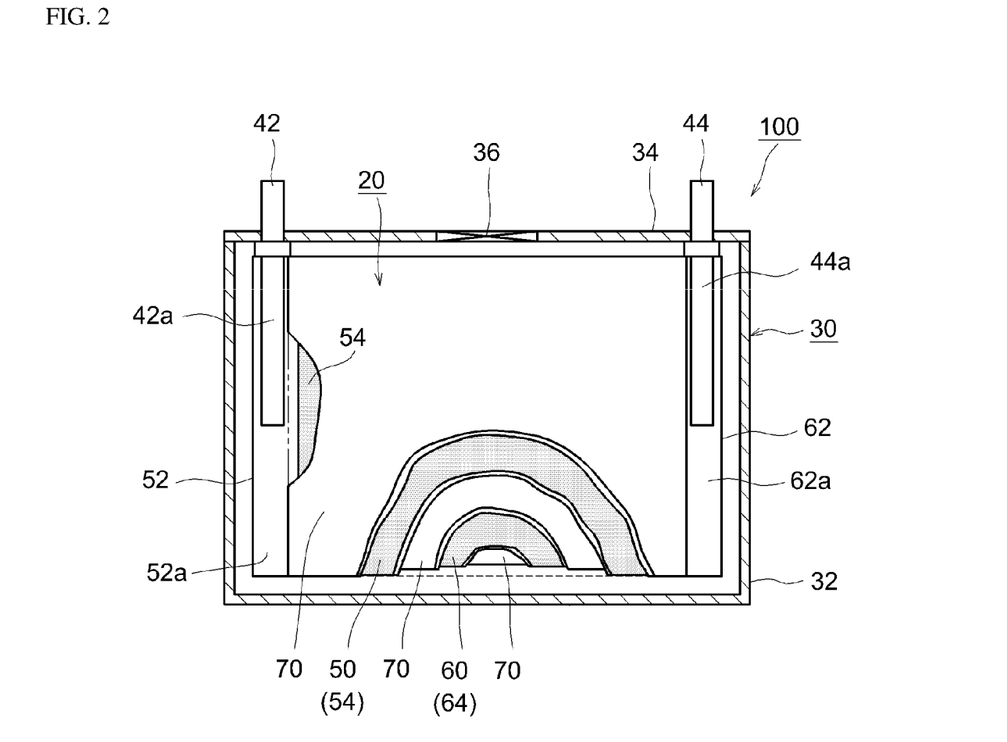
FIG. 2 is a longitudinal sectional view along the line shown by II-II in FIG. 1.

As shown in FIG. 1 and FIG. 2, a lithium ion secondary battery 100 according to the present embodiment has a constitution in which a flat wound electrode body (a wound electrode body) 20 is housed, together with a non-aqueous electrolyte solution, in a flat square (box-shaped) battery case 30. The battery case 30 includes a flat rectangular battery case main body 32, the top of which is open, and a lid 34 that seals this opening. A positive electrode terminal 42 for external connection, which is electrically connected to a positive electrode of the wound electrode body 20, and a negative electrode terminal 44, which is electrically connected to a negative electrode of the wound electrode body 20, are provided on the upper surface (that is, the lid 34) of the battery case 30. The lid 34 also includes a safety valve 36 for discharging gas generated inside the battery case 30 to outside the battery case 30, in the same way as a battery case for a conventional lithium ion secondary battery. Examples of materials for the battery case 30 include metal materials such as aluminum or steel; and resin materials such as poly(phenylene sulfide) resins and polyimide resins. The shape of the case (the external shape of the container) may be, for example, circular (cylindrical, coin-shaped or button-shaped), hexahedral (cuboid or cubic), bag-shaped or a shape obtained by processing and modifying these shapes.

Figure 3:
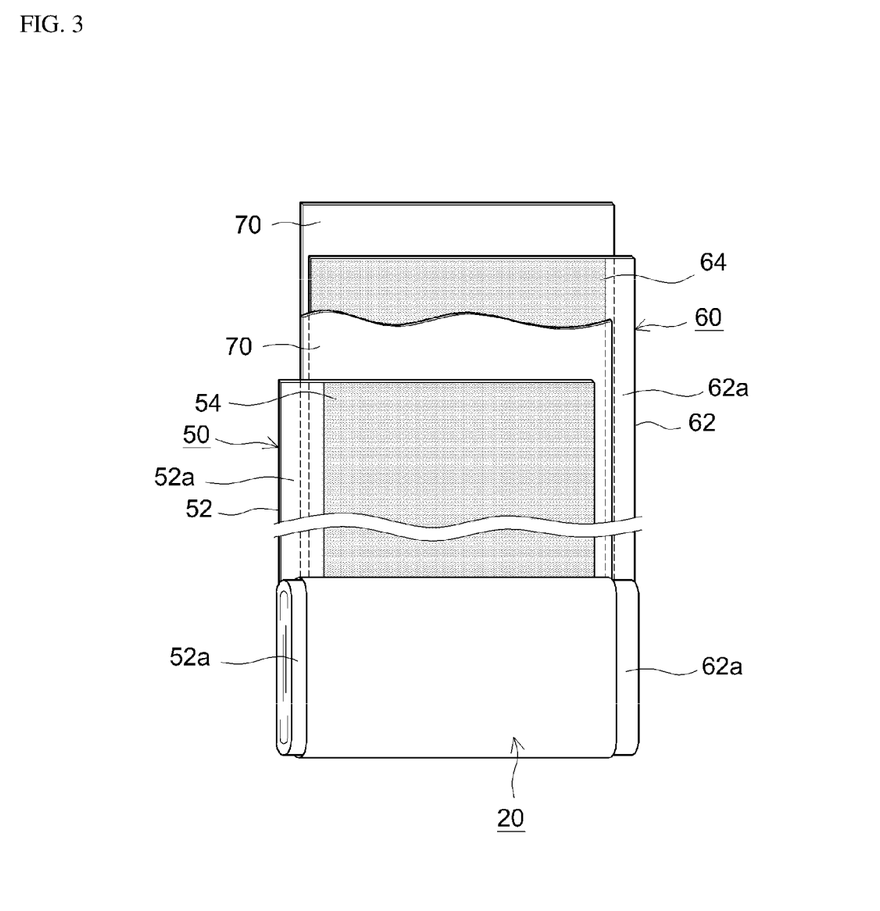
FIG. 3 is a schematic diagram that shows the constitution of a wound electrode body according to one embodiment.

A wound electrode body 20 according to the present embodiment has a long sheet-like structure (a sheet-shaped electrode body) in a previous stage of completion of forming the electrode body, as shown in FIG. 3. This wound electrode body 20 is constructed by laminating a positive electrode sheet 50, which is obtained by forming a positive electrode active material layer 54 in the longitudinal direction on one surface or both surfaces (both surfaces is in this case) of a long positive electrode current collector 52 made of a metal such as aluminum, and a negative electrode sheet 60, which is obtained by forming a negative electrode active material layer 64 in the longitudinal direction on one surface or both surfaces (both surfaces is in this case) of a long negative electrode current collector 62 made of a metal such as copper, with a long separator sheet 70 interposed therebetween, winding this laminate in the longitudinal direction, and faulting the resultant into a flat shape. A wound core part (that is, a part in which the positive electrode active material layer 54 of the positive electrode sheet 50, the negative electrode active material layer 64 of the negative electrode sheet 60, and the separator sheet 70 are tightly laminated) is formed in the central part in the winding axis direction of the wound electrode body 20. In addition, a positive electrode active material layer-non-forming part 52a of the positive electrode sheet 50 and a negative electrode active material layer-non-forming part 62a of the negative electrode sheet 60 protrude outwards from the wound core part at both edges of the wound electrode body 20 in the winding axis direction, respectively. A positive electrode current collector plate 42a and a negative electrode current collector plate 44a are attached to the positive electrode active material layer-non-forming part 52a and negative electrode active material layer-non-forming part 62a, respectively, and are electrically connected to the positive electrode terminal 42 (see FIG. 2) and negative electrode terminal 44 (see FIG. 2), respectively.

The positive electrode active material layer 54 contains at least the positive electrode active material. One or two or more materials usable as positive electrode active materials for lithium ion secondary batteries can be used without particular limitation as the positive electrode active material. Examples thereof include layered or spinel type lithium-metal composite oxides ($LiNiO_2$, $LiCoO_2$, $LiFeO_2$, $LiMn_2O_4$, $LiNi_{0.5}Mn_{1.5}O_4$, $LiCrMnO_4$, $LiFePO_4$, or the like). For example, a lithium-nickel-cobalt-manganese composite oxide which contains Li, Ni, Co and Mn as constituent elements and which has a layered structure (typically a layered rock salt structure belonging to the hexagonal system) (for example, $LiNi_{1/3}Co_{1/3}Mn_{1/3}O_2$) may be used due to exhibiting excellent thermal stability and a high theoretical energy density.

The form of the positive electrode active material is not particularly limited, but may be, for example, particulate or powdery. The average particle diameter of a particulate positive electrode active material may be 20 μm or lower (typically 1 to 20 μm, for example 5 to 15 μm). In addition, the specific surface area of a particulate positive electrode active material may be 0.1 $m^2/g$ or higher (typically 0.7 $m^2/g$ or higher, for example 0.8 $m^2/g$ or higher) and 5 $m^2/g$ or lower (typically 1.3 $m^2/g$ or lower, for example 1.2 $m^2/g$ or lower). It should be noted that in the present specification, "average particle diameter" means the particle diameter corresponding to a cumulative 50% from the small particle diameter side in a volume-based particle size distribution measured using particle size distribution measurements obtained using a conventional laser diffraction/light-scattering method (that is, the $D_{50}$ particle diameter or median diameter).

In addition to the positive electrode active material, the positive electrode active material layer 54 may contain one or two or more materials usable as constituent components of positive electrode active material layers 54 in ordinary lithium ion secondary batteries. Examples of such materials include electrically conductive materials and binders. Electrically conductive materials able to be used include carbon materials, such as various types of carbon black (typically acetylene black and ketjen black), coke coal, activated carbon, graphite, carbon fibers and carbon nanotubes. In addition, a vinyl halide-based resin such as poly(vinylidene fluoride) (PVdF); a poly(alkylene oxide) such as poly(ethylene oxide) (PEO); or the like can be used as a binder.

The proportion of the positive electrode active material relative to the overall positive electrode active material layer 54 should be approximately 60 mass % or higher (typically 60 to 99 mass %), and in some embodiments, may be from 70 to 95 mass %, in general. In cases where an electrically conductive material is used, the proportion of the electrically conductive material relative to the overall positive electrode active material layer 54 can be, for example, approximately 2 to 20 mass %, or from 3 to 10 mass %, in general. In cases where a binder is used, the proportion of the binder relative to the overall positive electrode active material layer 54 can be, for example, approximately 0.5 to 10 mass %, or from 1 to 5 mass %, in general.

The average thickness of the positive electrode active material layer 54 on each surface of the positive electrode current collector can be, for example, 20 μm or higher (such as 40 μm or higher or 50 μm or higher) and 100 μm or lower (such as 80 μm or lower). In addition, the density of the positive electrode active material layer 54 can be, for example, 1 to 4 $g/cm^3$ (for example, 1.5 to 3.5 $g/cm^3$). In addition, the void ratio (porosity) of the positive electrode active material layer 54 can be, for example, 10 to 50 vol. % (typically 20 to 40 vol. %). By satisfying such properties, it is possible to ensure an appropriate quantity of voids in the positive electrode active material layer 54 and allow the non-aqueous electrolyte solution to infiltrate sufficiently. As a result, a wide field of reaction with charge carriers can be ensured and high input-output characteristics can be achieved even in an extremely low temperature region. It should be noted that in the present specification, "porosity" means a value obtained by dividing the total pore volume ($cm^3$), as determined using a mercury porosimeter, by the apparent volume ($cm^3$) of the active material layer, and multiplying by 100.

The method for producing the positive electrode sheet 50 is not particularly limited. For example, a paste-like or slurry-like composition (hereinafter referred to as a positive electrode active material layer-forming slurry) is prepared by dispersing a positive electrode active material and other materials to be used in an appropriate solvent (for example, N-methyl-2-pyrrolidone). Next, the positive electrode active material layer-forming slurry is applied to the long positive electrode current collector 52, the solvent contained in the slurry is removed, and the slurry is dried and, optionally, pressed so as to produce the positive electrode sheet 50 in which the positive electrode active material layer 54 having the properties described herein is provided on the positive electrode current collector 52.

Meanwhile, the negative electrode active material layer 64 contains at least the negative electrode active material. One or two or more materials usable as negative electrode active materials for lithium ion secondary batteries can be used without particular limitation as the negative electrode active material. Examples thereof include carbon materials having a graphite structure (a layered structure) in at least a part of the material, such as graphite, poorly graphitizable carbon (hard carbon), readily graphitizable carbon (soft carbon), carbon nanotubes, and carbon materials having a structure in which the structures of these materials are combined. Graphite-based materials such as natural graphite and artificial graphite can be used in order to achieve a high energy density. In particular, in some embodiments, an amorphous substance-coated graphite-based material obtained by disposing amorphous carbon on the surface of graphite is used as the negative electrode active material. A conventional publicly known method, for example, a vapor phase method such as a CVD method in which a vapor phase coating raw material is vapor deposited on a core material (a graphite particle) in an inert gas atmosphere, a liquid phase method in which a solution obtained by diluting a coating raw material with an appropriate solvent is mixed with a core material and the coating raw material is then fired/carbonized in an inert gas atmosphere, or a solid phase method in which a core material and a coating raw material are kneaded without using a solvent and then fired/carbonized in an inert gas atmosphere, can be used as appropriate as a method for forming this type of amorphous substance coating.

The form of the negative electrode active material is not particularly limited, but may be, for example, particulate or powdery. The average particle diameter of this type of particulate negative electrode active material can be, for example, 50 μm or lower (such as 20 μm or lower, for example 1 to 20 µm, or even 5 to 15 µm). In addition, the specific surface area of this type of particulate negative electrode active material can be 1 m$^2$/g or higher (such as 2.5 m$^2$/g or higher, for example 2.8 m$^2$/g or higher) and 10 m$^2$/g or lower (such as 3.5 m$^2$/g or lower, for example 3.4 m$^2$/g or lower).

In addition to the negative electrode active material, the negative electrode active material layer 64 may contain one or two or more materials usable as constituent components of negative electrode active material layers in ordinary lithium ion secondary batteries. Examples of such materials include binders and a variety of additives. For example, a polymer material such as a styrene-butadiene rubber (SBR), poly(vinylidene fluoride) (PVdF) or polytetrafluoroethylene (PTFE) can be used as the binder. In addition, a variety of additives, such as thickening agents, dispersing agents and electrically conductive materials, can be used as appropriate, and carboxymethyl cellulose (CMC), methyl cellulose (MC), and the like can be used as thickening agents.

The proportion of the negative electrode active material relative to the overall negative electrode active material layer 64 should be approximately 50 mass % or higher, such as from 90 to 99 mass % or from 95 to 99 mass %. In cases where a binder is used, the proportion of the binder relative to the overall negative electrode active material layer 64 can be, for example, approximately 1 to 10 mass %, or from 1 to 5 mass %.

The average thickness of the negative electrode active material layer 64 on each surface of the negative electrode current collector can be, for example, 40 µm or higher (such as 50 µm or higher) and 100 µm or lower (such as 80 µm or lower). In addition, the density of the negative electrode active material layer 64 can be, for example, 0.5 to 2 g/cm$^3$ (such as from 1 to 1.5 g/cm$^3$). In addition, the porosity of the negative electrode active material layer 64 may be, for example, approximately 5 to 50 vol. %, such as from 35 to 50 vol. %. In addition, by satisfying such properties, it is possible to ensure an appropriate quantity of voids in the negative electrode active material layer 64 and allow the non-aqueous electrolyte solution to infiltrate sufficiently. As a result, a wide field of reaction with charge carriers can be ensured and high input-output characteristics can be achieved even in an extremely low temperature region.

The method for producing the negative electrode sheet 60 is not particularly limited. For example, a paste-like or slurry-like composition (hereinafter referred to as a negative electrode active material layer-forming slurry) is prepared by dispersing a negative electrode active material and other materials to be used in an appropriate solvent (for example, distilled water). Next, the negative electrode active material layer-forming slurry is applied to the long negative electrode current collector 62, the solvent contained in the slurry is removed, and the slurry is dried and, optionally, pressed so as to produce the negative electrode sheet 60 in which the negative electrode active material layer 64 is provided on the negative electrode current collector 62.

The separator sheet 70 interposed between the positive electrode sheet 50 and negative electrode sheet 60 should have the function of insulating the positive electrode active material layer 54 from the negative electrode active material layer 64, the function of retaining the non-aqueous electrolyte solution, and a shutdown function. Examples thereof include porous resin sheets (films) made of resins such as polyethylene (PE), polypropylene (PP), polyesters, cellulose and polyamides. The properties of the separator sheet 70 are not particularly limited. For example, the average thickness of the separator sheet may be 10 µm or more (such as 15 µm or more, for example 17 µm or more) and 40 µm or less (such as 30 µm or less, for example 25 µm or less).

The non-aqueous electrolyte solution according to the present embodiment will now be explained in detail. The non-aqueous electrolyte solution includes a non-aqueous solvent and an electrolyte (that is, a supporting salt), and the non-aqueous solvent is prepared using a cyclic carbonate-based solvent, a linear carbonate-based solvent, and an ester-based solvent as primary components. By incorporating both a cyclic carbonate-based solvent and a linear carbonate-based solvent, it is possible to achieve both a suitably high dielectric constant and low viscosity. Furthermore, by also incorporating an ester-based solvent, it is possible to lower the freezing point (and melting point) and enable use of a battery in the low temperature region.

In some embodiments, at least ethylene carbonate (EC) and propylene carbonate (PC) may be included in the non-aqueous electrolyte solution as cyclic carbonate-based solvents. A combination of EC, which has a high relative dielectric constant, and PC, which has a low freezing point (and melting point), contributes to an improvement in battery performance in the extremely low temperature region. Furthermore, addition of PC may improve durability (for example, storage characteristics and cycle characteristics). In addition, In some embodiments, at least dimethyl carbonate (DMC) and ethyl methyl carbonate (EMC) may be included in the non-aqueous electrolyte solution as linear carbonate. A combination of DMC and EMC, which have high oxidation potentials (wide potential windows), may improve battery performance. In addition, in some embodiments, at least ethyl propionate (EP) may be included in the non-aqueous electrolyte solution as the ester-based solvent. By adding EP, the freezing point (and melting point) of the non-aqueous electrolyte solution and the viscosity of the non-aqueous electrolyte solution in a low temperature region can be lowered. Furthermore, by adding EP in combination with PC, durability (for example, storage and cycle characteristics) can be better improved. By using a non-aqueous electrolyte solution in which these five solvents are all present, good performance (for example, good output retention) can be stably achieved even in an extremely low temperature region (for example, −40° C. to −30° C.). Furthermore, durability (for example, cycle characteristics and storage characteristics) can be improved.

In some embodiments, the non-aqueous electrolyte solution may be prepared so that, when the total volume of the non-aqueous solvents is 100 vol. %, the quantities of the five solvents mentioned above are such that the content of EC is 20 to 30 vol. %, the content of PC is 5 to 15 vol. % (for example, 5 to 10 vol. % or 10 to 15 vol. %), the content of EP is 5 to 15 vol. % (for example, 5 to 10 vol. % or 10 to 15 vol. %), and the total content of DMC and EMC is 50 to 70 vol. %. By using a non-aqueous electrolyte solution having this composition, it is possible to achieve good battery performance in the extremely low temperature region while maintaining the flash point of the electrolyte solution at a temperature of 21° C. or higher. In some embodiments, the content of both PC and EP may be 5 to 10 vol. %. This makes it possible to achieve better durability (for example, storage and cycle characteristics).

As long as the non-aqueous electrolyte solution is prepared using mainly the five types of solvent mentioned above, other organic solvent components may be contained in the electrolyte solution. Examples of such optional components able to be added include 1,2-butylene carbonate, 2,3-butylene carbonate, 1,2-pentylene carbonate, 2,3-pentylene carbonate, 4-fluoro-1,3-dioxolan-2-one, trans- or cis-4, 5-difluoro-1,3-dioxolan-2-one, vinylene carbonate, vinyl ethylene carbonate and 4-ethynyl-1,3-dioxolan-2-one, which are cyclic carbonate-based solvents. In addition, examples of other types of optional components able to be added include diethyl carbonate, dipropyl carbonate, methyl propyl carbonate, methyl isopropyl carbonate, ethyl propyl carbonate, methyl butyl carbonate and dibutyl carbonate, which are linear carbonate-based solvents. In addition, examples of other types of optional components able to be added include methyl acetate, ethyl acetate, propyl acetate, methyl propionate, γ-butyrolactone, γ-valerolactone, γ-caprolactone, δ-valerolactone and ε-caprolactone, which are ester-based solvents.

For example, it is possible to use one or two or more types of lithium compound (lithium salt), such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$ or LiI, as the electrolyte (that is, supporting salt). In some embodiments, the electrolyte is $LiPF_6$. Moreover, the concentration of the electrolyte is not particularly limited, but can be approximately 0.1 to 5 mol/L (for example, 0.5 to 3 mol/L, and typically 0.8 to 1.5 mol/L). Moreover, in cases where the non-aqueous electrolyte secondary battery is a sodium ion secondary battery, a sodium-containing electrolyte (supporting salt) such as $NaPF_6$ may be used.

In addition, the non-aqueous electrolyte solution may contain optional additional components as long as the object of the present teaching can be achieved. For example, it is possible to incorporate a variety of additives in order to improve the output performance of the battery, improve storage stability (suppress a decrease in battery capacity during storage), improve cycle characteristics, improve initial charging and discharging efficiency, and the like.

Examples of such additives include gas-generating agents, film-forming agents, dispersing agents, and thickening agents. In addition, by blending the variety of non-aqueous solvents and electrolytes mentioned above as well as a variety of additives that are added where appropriate, it is possible to prepare a non-aqueous electrolyte solution having the target composition.

A lithium ion secondary battery such as that shown in the drawings is produced using the various materials and members mentioned above. This production method (that is, a method for constructing a lithium ion secondary battery) per se can be carried out as appropriate using a method that has been used conventionally, and because the production method does not characterize the present teaching, a detailed description of the production method is omitted here.

The lithium ion secondary battery disclosed herein can be used in a variety of applications. Since the lithium ion secondary battery exhibits excellent battery performance in an extremely low temperature region (especially −30° C. or lower, for example −40° C. to −30° C.), the lithium ion secondary battery can therefore be used as a power source for driving a vehicle in the extremely low temperature region. The type of vehicle is not particularly limited, but examples thereof include plug-in hybrid vehicles (PHV), hybrid vehicles (HV), electric vehicles (EV), electrically assisted bicycles, electrically powered wheelchairs and electric trains. Lithium ion secondary batteries provided in vehicles are generally used in the form of battery packs obtained by connecting a plurality of batteries, as was the case in the past, and diagrams showing the structure of battery packs and the like are omitted.

EXAMPLES

Several experimental examples relating to the present teaching will now be explained, but the present teaching is in no way limited to these specific examples.

Preparation of Non-Aqueous Electrolyte Solution

First, 14 types of non-aqueous electrolyte solutions for lithium ion secondary batteries (Examples 1 to 14) were prepared by using $LiPF_6$ as an electrolyte, and ethylene carbonate (EC), propylene carbonate (PC), dimethyl carbonate (DMC), ethyl methyl carbonate (EMC) and ethyl propionate (EP) as non-aqueous solvents, and mixing these at the blending proportions (volume proportions) shown in Table 1. The concentration of $LiPF_6$ was 1.1 M in each electrolyte solution. The freezing point (° C.) and flash point temperature range (21° C. or higher is indicated by O, and lower than 21° C. is indicated by X) at atmospheric pressure of each non-aqueous electrolyte solution were as shown in the relevant column in Table 1.

TABLE 1

| Example | EC (vol. %) | PC (vol. %) | DMC (vol. %) | EMC (vol. %) | EP (vol. %) | Freezing point (° C.) | Flash point temperature region |
|---|---|---|---|---|---|---|---|
| 1 | 20 | 10 | 30 | 30 | 10 | −49 | O |
| 2 | 20 | 10 | 40 | 30 | 0 | −38 | O |
| 3 | 30 | 0 | 30 | 30 | 10 | −42 | O |
| 4 | 30 | 0 | 40 | 30 | 0 | −37 | O |
| 5 | 0 | 30 | 40 | 30 | 0 | −37 | O |
| 6 | 15 | 15 | 40 | 30 | 0 | −35 | O |
| 7 | 0 | 0 | 40 | 30 | 30 | <−50 | X |
| 8 | 30 | 0 | 25 | 45 | 0 | −49 | O |
| 9 | 30 | 0 | 40 | 30 | 0 | −37 | O |
| 10 | 25 | 5 | 40 | 30 | 0 | −37 | O |
| 11 | 25 | 5 | 35 | 30 | 5 | −44 | O |
| 12 | 30 | 0 | 35 | 30 | 5 | −40 | O |
| 13 | 30 | 0 | 25 | 30 | 15 | −44 | X |
| 14 | 15 | 15 | 25 | 30 | 15 | <−50 | X |

As shown in Table 1, it is possible to lower the freezing point of the overall non-aqueous electrolyte solution by increasing the blending proportion of EP or EMC, which have low melting points. However, it can be said that such blending proportions cause the flash point temperature region to be lower than 21° C. (see Examples 7, 13 and 14), which is undesirable from the perspective of safety. Meanwhile, it can be understood that Example 1, in which both PC and EP were blended at a proportion of 10 vol. %, and Example 11, in which both PC and EP were blended at a proportion of 5 vol. %, may enable lowering the freezing point to −49° C. (see Example 1) or −44° C. (see Example 11) without causing the flash point temperature region to fall below 21° C. In addition, although detailed data is not shown, Examples 1 and 11 are low viscosity non-aqueous electrolyte solutions that have good viscosity in a low temperature region of 0° C. or lower.

Evaluation of Ionic Conductivity

The ionic conductivity [mS/cm] of each non-aqueous electrolyte solution of Examples 1 to 14 prepared above was measured. Measurements were carried out by means of an alternating current impedance method using a sealed twin electrode cell manufactured by Toyo System Co., Ltd. The non-aqueous electrolyte solution being tested was regulated to a fixed size and thickness by means of a polytetrafluoroethylene spacer and sandwiched between a pair of stainless steel electrodes. Using a Cole-Cole plot obtained by applying a voltage of 10 mV to the cell and altering the frequency from 1 MHz to 10 mHz, the bulk resistance was determined by means of curve fitting using an equivalent circuit, and the ionic conductivity was calculated from the bulk resistance. Ionic conductivity was measured at three measurement temperatures, namely −40° C., −30° C. and 25° C. The obtained results are shown in Table 2.

TABLE 2

| Example | Conductivity (mS/cm) | | |
| --- | --- | --- | --- |
| | @−40° C. | @−30° C. | @25° C. |
| 1 | 1.1 | 2.1 | 10.3 |
| 2 | 0.9 | 1.9 | 10.4 |
| 3 | 1.1 | 2.1 | 10.6 |
| 4 | 0.9 | 1.9 | 10.7 |
| 5 | 0.9 | 1.9 | 10.3 |
| 6 | 0.9 | 1.9 | 10.4 |
| 7 | 1.2 | 2.2 | 10.0 |
| 8 | 1.0 | 1.8 | 9.8 |
| 9 | 0.9 | 1.9 | 10.7 |
| 10 | 0.8 | 1.8 | 10.3 |
| 11 | 1.2 | 2.2 | 10.3 |
| 12 | 1.0 | 2.0 | 10.5 |
| 13 | 1.2 | 2.2 | 10.6 |
| 14 | 0.9 | 1.9 | 10.3 |

As shown in Table 2, the non-aqueous electrolyte solution of Example 1, which contained both PC and EP at a proportion of 10 vol. %, exhibited relatively good ionic conductivity at temperatures of −30° C. and −40° C. Similarly, the non-aqueous electrolyte solution of Example 11, which contained both PC and EP at a proportion of 5 vol. %, exhibited relatively good ionic conductivity at temperatures of −30° C. and −40° C. However, the non-aqueous electrolyte solutions of Examples 3, 7 and 13 exhibited good ionic conductivity at temperatures of −30° C. and −40° C., but Example 3 had a higher freezing point than Example 1 and cannot be said to be suitable for use in an extremely low temperature region (for example, −40° C. to −30° C.), and Examples 7 and 13 were not suitable due to having a flash point temperature region of lower than 21° C., as mentioned above.

Construction of Lithium Ion Secondary Battery $LiNi_{1/3}Co_{1/3}Mn_{1/3}O_2$ (LNCM) was prepared as a positive electrode active material powder. A positive electrode active material layer-forming slurry was prepared by feeding LNCM, acetylene black (AB) as an electrically conductive material and poly(vinylidene fluoride) (PVdF) as a binder into a kneader at the mass ratio of these materials such that LNCM:AB:PVdF=94:3.5:2.5, and then kneading them while adjusting the viscosity thereof by means of N-methylpyrrolidone (NMP). A positive electrode sheet having positive electrode active material layers having a density of approximately 2.9 g/cm$^3$ on a positive electrode current collector was prepared by coating this slurry on both surfaces of an aluminum foil (a positive electrode current collector) having a thickness of 12 μm, drying the slurry, and then pressing.

Spherical natural graphite (C) whose surface had been coated with amorphous carbon was prepared as a negative electrode active material powder. A negative electrode active material layer-forming slurry was prepared by feeding the graphite (C), a styrene-butadiene rubber (SBR) as a binder and CMC as a thickening agent into a kneader at the mass ratio of these materials such that C:SBR:CMC=99:0.5:0.5, and then kneading them while adjusting the viscosity thereof by means of ion exchanged water. A negative electrode sheet having negative electrode active material layers having a density of approximately 1.4 g/cm$^3$ on a negative electrode current collector was prepared by coating this slurry on both surfaces of a copper foil (a negative electrode current collector) having a thickness of 8 μm, drying the slurry, and then pressing.

An electrode body was produced by winding the thus produced positive electrode sheet and negative electrode sheet together with two separator sheets each having a thickness of 20 μm and having a three-layer structure formed from polyethylene (PE) and polypropylene (PP) (PP/PE/PP), and then forming the wound article into a flat shape. Next, a positive electrode terminal and a negative electrode terminal were attached to an aluminum battery case lid, and these terminals were welded to the positive electrode current collector and negative electrode current collector exposed at the edges of the wound electrode body. The wound electrode body, to which the lid was connected in this way, was placed in an aluminum battery case main body through the opening of the battery case main body, and the lid was welded on the opening. Next, one of the non-aqueous electrolyte solutions of Examples 1 to 14 shown in Table 1 was introduced via an electrolyte solution injection hole provided in the lid, and the electrolyte solution injection hole was then hermetically sealed. In this way, battery assemblies of Examples 1 to 14 corresponding to the non-aqueous electrolyte solutions of Examples 1 to 14 were constructed.

As a conditioning treatment, the thus produced battery assemblies of Examples 1 to 14 were each subjected to constant current (CC) charging for 3 hours at a rate of ⅓ C (1 C is a current whereby full charging and discharging is possible in 1 hour) in an environment having a temperature of 25° C., followed by three repetitions of a procedure of charging to 4.1 V at a rate of ⅓ C and a procedure of discharging to 3.0 V at a rate of ⅓ C. Next, following the charging treatment described above, the batteries were left to stand for 24 hours in an environment having a temperature of 60° C. (typically in a thermostatic chamber regulated to a temperature of 60° C.) as an aging treatment. Lithium ion secondary batteries for evaluation tests according to Examples 1 to 14 were constructed in this way.

Measurement of Initial Battery Capacity

After the conditioning treatment described above, the lithium ion secondary batteries for evaluation tests according to Examples 1 to 14 were subjected to the initial battery capacity measurement including steps 1 to 3 below in an environment having a temperature of 25° C. within a voltage range of 3.0 V to 4.1 V.

Step 1. After reaching a voltage of 3.0 V through constant current discharging at a discharging rate of ⅓ C, the battery was discharged for 2 hours by constant voltage discharging, and then allowed to rest for 10 minutes.

Step 2. After reaching a voltage of 4.1 V through constant current charging at a charging rate of ⅓ C, the battery was subjected to constant voltage charging until the current reached 1/100 C, and then allowed to rest for 10 minutes.

Step 3. After reaching a voltage of 3.0 V through constant current discharging at a discharging rate of 1/3 C, the battery was subjected to constant voltage discharging until the current reached 1/100 C, and then allowed to rest for 10 minutes.

The discharge capacity (CCCV discharge capacity) in discharging from the constant current discharging to the constant voltage discharging in Step 3 was set as the initial battery capacity.

Measurement of IV Resistance

The IV resistance (reactive resistance) of the lithium ion secondary batteries according to Examples 1 to 14 was measured. That is, each battery was charged from 3.0 V at a constant current of 1 C and adjusted to a charged state corresponding to a SOC (State of Charge) of 60%, and then discharged at a constant current (CC) for 2 seconds at a rate of 10 C (high rate discharging) in an environment having a temperature of −40° C., −30° C. or 25° C., and the IV resistance (mΩ) was determined at this point from the slope of a primary approximation line on a plot of current (I) against voltage (V). The results are shown in Table 3.

Evaluation of Storage Characteristics

The lithium ion secondary batteries according to Examples 1 to 14, whose initial capacities had been measured, were adjusted to a charged state corresponding to a SOC of 80% by means of a CCCV method. Next, each battery was stored for 120 days in a thermostatic chamber at 60° C., after which the battery capacity following storage of each battery was measured using the same procedure as that used to measure the initial battery capacity. Here, the capacity retention rate (%) following storage for 120 days was determined from the formula (battery capacity following storage/initial battery capacity)×100, and these capacity retention rates are shown in Table 3 as indicators of the storage characteristics of the batteries.

Evaluation of Cycle Characteristics

The cycle capacity retention rates (cycle characteristics) of the lithium ion secondary batteries according to Examples 1 to 14 were also measured. Specifically, after measuring the initial capacity mentioned above in an environment having a temperature of 25° C., each battery was subjected to 1000 cycles of CC charging and discharging at a rate of 2 C, and the discharge capacity after 1000 cycles was measured. Here, the capacity retention rate (%) following this cycle test was determined from the formula (discharged battery capacity after 1000 cycles/initial battery capacity)×100, and these capacity retention rates are shown in Table 3 as indicators of the cycle characteristics of the batteries.

TABLE 3

| | IV resistance (mΩ) | | | Durability (%) | |
|---|---|---|---|---|---|
| Example | @−40° C. | @−30° C. | @25° C. | 60° C. storage | Cycle |
| 1 | 601 | 275 | 24 | 87 | 83 |
| 2 | 630 | 276 | 24 | 90 | 84 |
| 3 | 606 | 277 | 24 | 88 | 83 |
| 4 | 634 | 276 | 24 | 89 | 85 |
| 5 | — | — | — | — | — |
| 6 | 634 | 276 | 24 | 85 | 82 |
| 7 | 598 | 272 | 25 | 80 | 75 |
| 8 | 630 | 282 | 25 | 88 | 84 |
| 9 | 601 | 275 | 24 | 79 | 73 |
| 10 | 630 | 274 | 25 | 86 | 87 |
| 11 | 589 | 269 | 25 | 88 | 84 |
| 12 | 602 | 275 | 25 | 87 | 84 |
| 13 | 610 | 279 | 25 | 85 | 83 |
| 14 | 613 | 281 | 25 | 80 | 77 |

As shown in Table 3, the lithium ion secondary battery provided with the non-aqueous electrolyte solution of Example 1, which contained both PC and EP at a proportion of 10 vol. %, and the lithium ion secondary battery provided with the non-aqueous electrolyte solution of Example 11, which contained both PC and EP at a proportion of 5 vol. %, exhibited relatively low IV resistance values, which are good, at temperatures of −30° C. and −40° C. In addition, these lithium ion secondary batteries exhibited relatively good storage characteristics at 60° C. and cycle characteristics, and thus it is understood that these lithium ion secondary batteries achieved both good battery performance in the extremely low temperature region and good durability. Meanwhile, the lithium ion secondary batteries provided with the non-aqueous electrolyte solutions of Examples 3, 7, 9 and 12 exhibited relatively low IV resistance values, which are good, at temperatures of −30° C. and −40° C. However, as discussed above, Examples 3 and 12 had higher freezing points than Examples 1 and 11, and cannot be said to be suitable for use in the extremely low temperature region. In addition, Example 7 was not suitable due to having a flash point temperature region of lower than 21° C., as mentioned above, and Example 9 had a higher freezing point than Example 1. In addition, the lithium ion secondary battery provided with the non-aqueous electrolyte solution of Example 9 had the lower durability than the lithium ion secondary battery provided with the non-aqueous electrolyte solution of Example 1, and thus, cannot be said to be as good as the lithium ion secondary battery provided with the non-aqueous electrolyte solution of Example 1. Moreover, Example 5, which contained only PC as a cyclic carbonate-based solvent, suffered from detachment of a graphite surface layer, was difficult to charge and discharge, and could not be used.

What is claimed is:

1. A non-aqueous electrolyte secondary battery, comprising:
    a positive electrode active material layer comprising a positive electrode active material;
    a negative electrode active material layer comprising a negative electrode active material, where the negative electrode active material is spherical natural graphite coated with amorphous carbon; and
    a non-aqueous electrolyte solution containing a non-aqueous solvent and an electrolyte, wherein the non-aqueous solvent:
        contains at least ethylene carbonate (EC) and propylene carbonate (PC) as cyclic carbonate-based solvents,
        contains at least dimethyl carbonate (DMC) and ethyl methyl carbonate (EMC) as linear carbonate-based solvents, and
        contains at least ethyl propionate (EP) as an ester-based solvent, and
        when the total volume of the non-aqueous solvent is 100 vol. %:
            the content of EC is 20 to 30 vol. %;
            the content of PC is 5 to 10 vol. %;
            the content of EP is 5 to 10 vol. %; and
            the content of DMC+EMC is 50 to 70 vol. %.

2. The non-aqueous electrolyte secondary battery according to claim 1, wherein the content of the dimethyl carbonate (DMC) and the content of the ethyl methyl carbonate (EMC) are both 25 to 35 vol. % based on the total volume of the non-aqueous solvent.

3. The non-aqueous electrolyte secondary battery according to claim 1, wherein the non-aqueous electrolyte solution has a freezing point of lower than −40° C. and not lower than −60° C.

4. The non-aqueous electrolyte secondary battery according to claim 1, wherein the non-aqueous electrolyte solution has an ionic conductivity (mS/cm) of 1.0 or more at −40° C.

5. The non-aqueous electrolyte secondary battery according to claim 1, wherein the positive electrode active material has an average particle diameter (D50) of from 1 μm to 20 μm.

6. The non-aqueous electrolyte secondary battery according to claim 1, wherein the positive electrode active material has a specific surface area of from 0.1 m²/g to 5 m²/g.

7. The non-aqueous electrolyte secondary battery according to claim 1, wherein the positive electrode active material layer has a void ratio of from 10% to 50%.

8. The non-aqueous electrolyte secondary battery according to claim 1, wherein the positive electrode active material layer comprises from 60 mass % to 99 mass % positive electrode active material based on the total mass of the positive electrode active material layer.

9. The non-aqueous electrolyte secondary battery according to claim 1, wherein the positive electrode active material comprises $LiCrMnO_4$.

10. The non-aqueous electrolyte secondary battery according to claim 1, wherein the negative electrode active material has an average particle diameter (D50) of from 1 μm to 50 μm.

11. The non-aqueous electrolyte secondary battery according to claim 1, wherein the negative electrode active material has a specific surface area of from 1 m²/g to 10 m²/g.

12. The non-aqueous electrolyte secondary battery according to claim 1, wherein the negative electrode active material layer has a void ratio of from 5% to 50%.

13. The non-aqueous electrolyte secondary battery according to claim 1, wherein the negative electrode active material layer comprises from 50 mass % to 99 mass % negative electrode active material based on the total mass of the negative electrode active material layer.

14. The non-aqueous electrolyte secondary battery according to claim 1, wherein the electrolyte comprises a sodium salt.

15. The non-aqueous electrolyte secondary battery according to claim 14, wherein the sodium salt comprises $NaPF_6$.

16. The non-aqueous electrolyte secondary battery according to claim 1, further comprising at least one separator sheet comprising a three-layer structure comprising polypropylene/polyethylene/polypropylene.

* * * * *

UNITED STATES PATENT AND TRADEMARK OFFICE
CERTIFICATE OF CORRECTION

PATENT NO. : 10,535,867 B2
APPLICATION NO. : 15/870457
DATED : January 14, 2020
INVENTOR(S) : Kenta Ishii et al.

Page 1 of 1

It is certified that error appears in the above-identified patent and that said Letters Patent is hereby corrected as shown below:

In Column 4, Line 54, delete "faulting" and insert --forming--, therefor.

Signed and Sealed this
Thirty-first Day of March, 2020

Andrei Iancu
*Director of the United States Patent and Trademark Office*